(12) United States Patent
Pearson et al.

(10) Patent No.: US 7,306,174 B2
(45) Date of Patent: Dec. 11, 2007

(54) BROADCAST WIDTH AND LOCATION CONTROL FOR A COMBINE SPREADER

(75) Inventors: Mark Leonard Pearson, LeClaire, IA (US); Ryan Patrick Mackin, Milan, IL (US)

(73) Assignee: Deere & Company, Moline, IL (US)

( * ) Notice: Subject to any disclaimer, the term of this patent is extended or adjusted under 35 U.S.C. 154(b) by 412 days.

(21) Appl. No.: 10/793,052

(22) Filed: Mar. 4, 2004

(65) Prior Publication Data

US 2005/0194473 A1    Sep. 8, 2005

(51) Int. Cl.
*A01C 15/00* (2006.01)
(52) U.S. Cl. .............. 239/663; 239/667; 239/677; 239/682; 239/684; 239/665; 460/111; 460/112
(58) Field of Classification Search .......... 239/663, 239/675, 677, 685, 63, 69, 665, 667, 682, 239/684; 460/111, 112
See application file for complete search history.

(56) References Cited

U.S. PATENT DOCUMENTS

| | | | |
|---|---|---|---|
| 4,383,536 A | 5/1983 | Delorme | |
| 4,617,942 A | 10/1986 | Garner et al. | |
| 4,684,068 A | 8/1987 | Busboom et al. | |
| 5,021,030 A | 6/1991 | Halford et al. | |
| 5,215,500 A | 6/1993 | Kirby | |
| 5,569,081 A | 10/1996 | Baumgarten et al. | |
| 5,797,793 A | 8/1998 | Matousek et al. | |
| 5,904,296 A * | 5/1999 | Doherty et al. | 239/61 |
| 6,173,904 B1 | 1/2001 | Doherty et al. | |
| 6,238,286 B1 | 5/2001 | Aubry et al. | |
| 6,331,142 B1 | 12/2001 | Bischoff | |
| 6,416,405 B1 | 7/2002 | Niermann | |
| 6,783,454 B2 * | 8/2004 | Bueermann | 460/112 |
| 6,840,853 B2 * | 1/2005 | Foth | 460/111 |
| 6,866,580 B2 * | 3/2005 | Weichholdt et al. | 460/112 |
| 6,881,145 B2 * | 4/2005 | Holmen | 460/112 |
| 7,086,942 B2 * | 8/2006 | Niermann et al. | 460/111 |
| 2002/0072400 A1 | 6/2002 | Foth | |
| 2003/0003974 A1 | 1/2003 | Niermann et al. | |
| 2003/0017861 A1 | 1/2003 | Niermann et al. | |
| 2003/0162576 A1 | 8/2003 | Bueermann | |

* cited by examiner

*Primary Examiner*—Dinh Q. Nguyen (57) ABSTRACT

A work vehicle having a fluent material spreader comprising two counter-rotating variable speed impellers adapted to receive and broadcast fluent material. A right-side impeller broadcasts out to a right-side material broadcast width, and left-side impeller broadcasts out to a left-side material broadcast width. Rotational speed of the right-side impeller is commanded to achieve a desired a right-side material broadcast width, and rotational speed of the left-side impeller is commanded to achieve a desired a left-side material broadcast width. Command of the right-side and left-side impellers is achieved either manually by and operator, or automatically by a control system based on sensor input.

12 Claims, 10 Drawing Sheets

BROADCAST WIDTH AND LOCATION CONTROL FOR A COMBINE SPREADER

FIELD OF THE INVENTION

The present invention relates to control of a rotating material spreader, and more specifically, broadcast width and location control for an impeller-type material spreader of an agricultural combine.

BACKGROUND OF THE INVENTION

A combine is a machine that is used in grain farming to harvest a variety of crops from a field. Combines are typically self-propelled, but some are also towed and powered by tractors. As a combine moves through a field during a harvesting operation, the ripened crop is cut from the field by a header at the front of the combine. The crop is then transferred into threshing and separating assemblies within the combine, where grain is removed from the crop material. Crop material other than grain (MOG) is expelled from rear of the combine.

An impeller-type spreader is an assembly attached to the rear of the combine that is adapted to receive MOG expelled from the combine and evenly broadcast it over a wide area of ground behind the combine. The spreader typically comprises a right-side impeller and a left-side impeller that counter-rotate on parallel axes. Generally, distribution of MOG to the right-side of the combine is attributed to the right-side impeller, and similarly, distribution of MOG to the left-side of the combine is attributed to the left-side impeller. The overall width of MOG distribution by the spreader is largely dependent on the rotational speed of the impellers. The higher the rotational speed of the impellers, the wider the resulting broadcast width.

When MOG is broadcast by a spreader, it is desirable that the it cover only the region that the combine has just cut. External conditions, such as cross-winds and side-slopes can cause the MOG to be spread onto un-cut regions. In addition, crop conditions, such crop type and moisture content, can affect spreader broadcast width. Conversely, MOG from lighter and dryer crop may become spread well beyond the width of the cut portion. All of these conditions can result in uneven broadcast coverage of MOG over a harvested field, which is undesirable. Thus an effective means of maintaining a constant spreader broadcast width and location, irregardless of external or crop conditions, is desired.

SUMMARY OF THE INVENTION

The present invention provides an effective means of maintaining a constant spreader broadcast width and location for an impeller-type combine spreader by controlling impeller rotational speeds. In a first embodiment, the impeller rotational speeds are varied manually by an operator to maintain a desired broadcast width and location. In a second embodiment of the present invention, the impeller rotational speeds are varied automatically to maintain a desired broadcast width and location by a control system that directly monitors the edges of the broadcast width. In a third embodiment of the present invention, the impeller rotational speeds are varied automatically to maintain a desired broadcast location by a control system that monitors environmental conditions.

DETAILED DESCRIPTION

Figure 1:
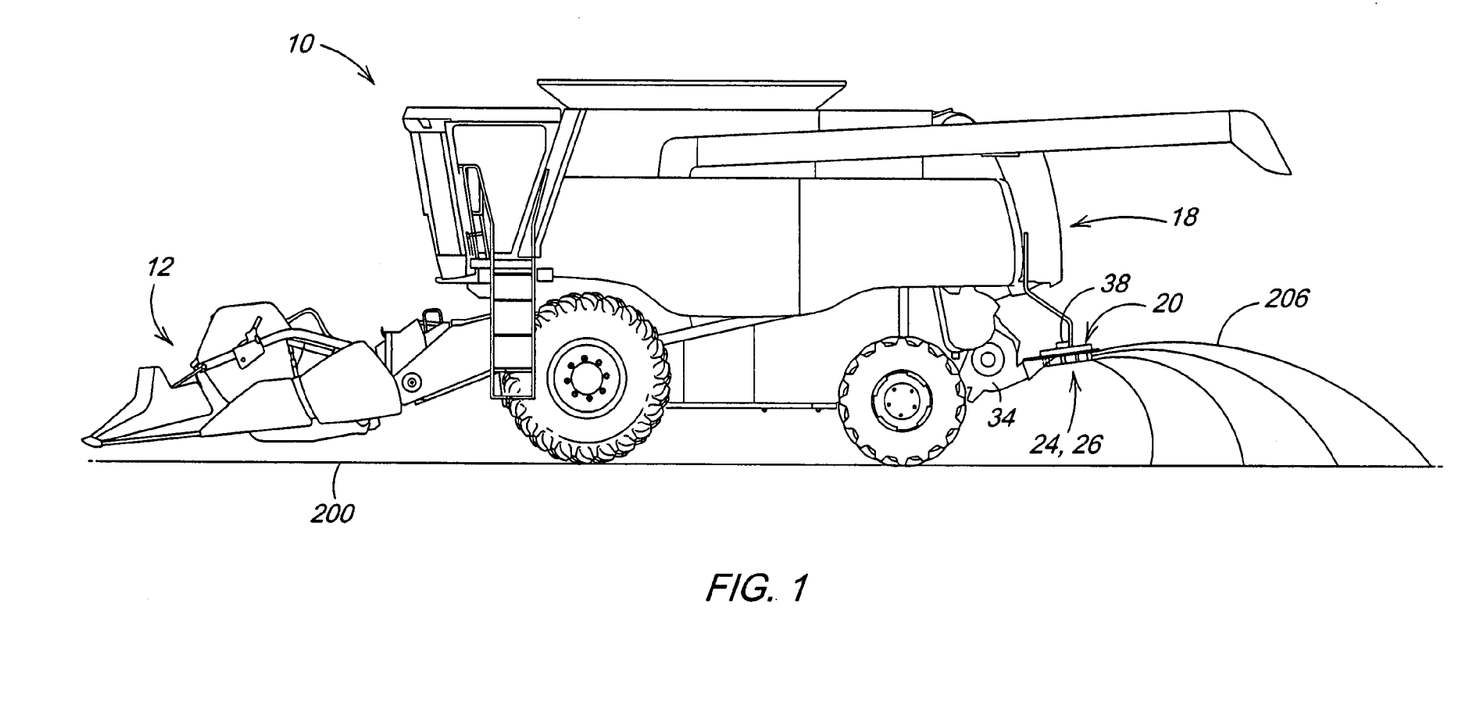
FIG. 1 is a side view of a combine shown with an impeller-type spreader.

FIG. 1 illustrates a combine 10 commonly used in grain farming to harvest a variety of crops from a field 200. Combines 10 are typically self-propelled, but some are also towed and powered by tractors. As a combine 10 moves through a field 200 during a harvesting operation, the ripened crop 202 is cut from the field 200 by a header 12 at the front of the combine 10. The crop 202 is then transferred into threshing and separating assemblies within the combine 10, where grain is removed from the crop material 202. The grain is transferred and stored in a hopper onboard the combine 10 until it can be off-loaded for transport. The crop material other than grain (MOG) 206 is expelled from the rear of the combine 18. However, before the MOG 206 is expelled, it may be further processes or chopped, and then broadcast over a wide area behind the combine by a spreader 20. For greater broadcast widths, spreaders 20 comprised of counter-rotating impellers 24 and 26 or flails are commonly employed for this task.

Figure 2:
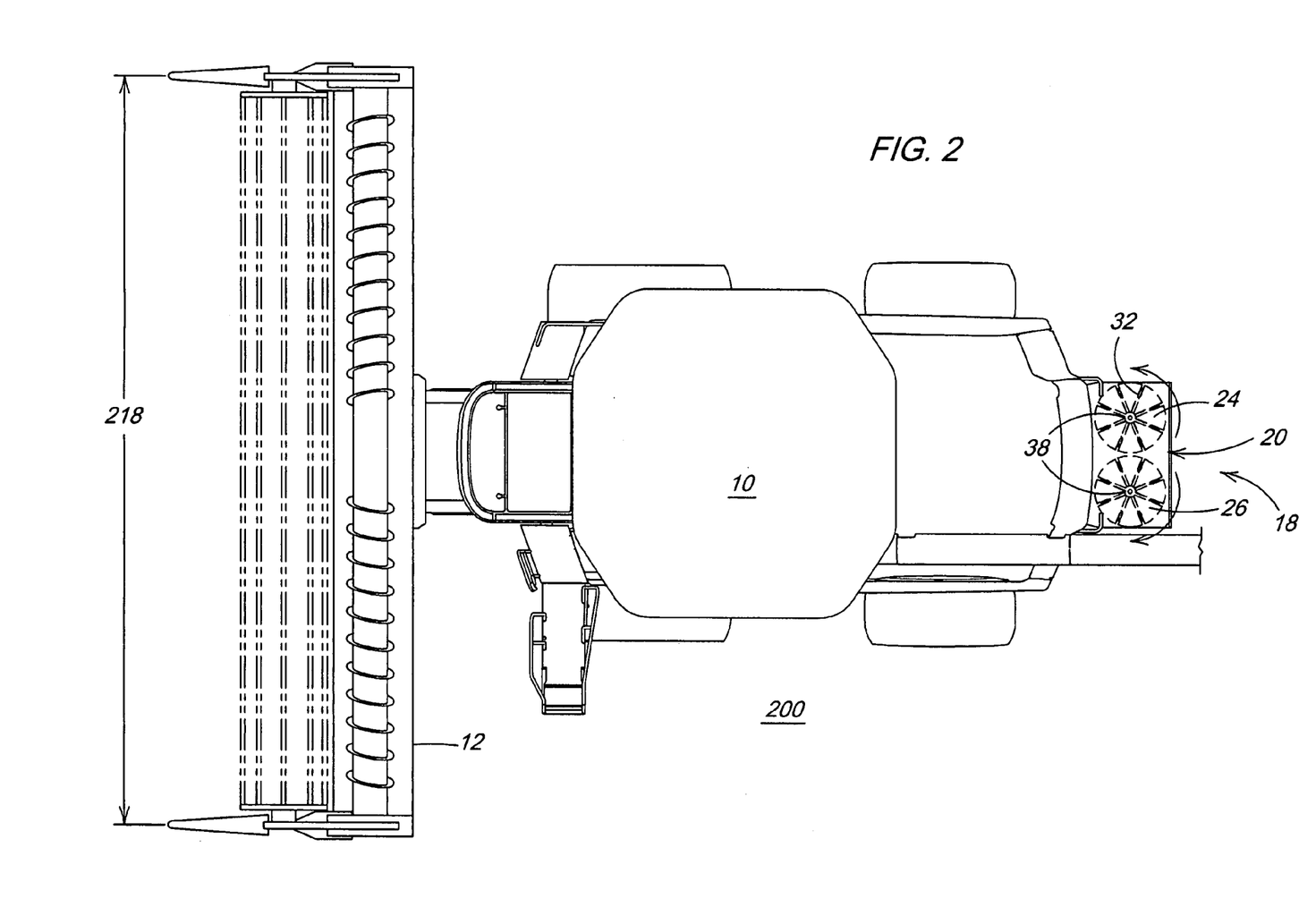
FIG. 2 is a top view of the combine shown with an impeller-type spreader.

The combine 10 illustrated in FIG. 1 is shown with an impeller-type spreader 20 attached at the rear 18. The spreader 20 comprises a right-side impeller 24, and a left-side impeller 26, that counter-rotate on parallel axes, as indicated in FIG. 2. Generally, the axes are oriented substantially vertically, but may be inclined either forward or rearward to optimize spreader 20 performance. The impellers 24 and 26 in the illustrated embodiment are open to the bottom, and have downwardly extending impeller blades 32 that engage the MOG 206. Although the present invention is illustrated as having eight impeller blades 32 per impeller 24 and 26, other arrangements have been found satisfactory including six impeller blades 32 per impeller 24 and 26. The impellers 24 and 26 are adapted to receive MOG 206 from a stalk chopper 34 in a flow nearly parallel to their plane of rotation, or from slightly below. Typically, these impellers 24 and 26 are driven by hydraulic motors 38, but might also be powered by electric motors or other mechanical transmission means. Although not shown, it should also be noted that the present invention is equally applicable to almost any type of impeller or flail-type spreader, including those that receive MOG 206 from above or below, or in a flow generally perpendicular to the plane of impeller or flail rotation.

Figure 3:
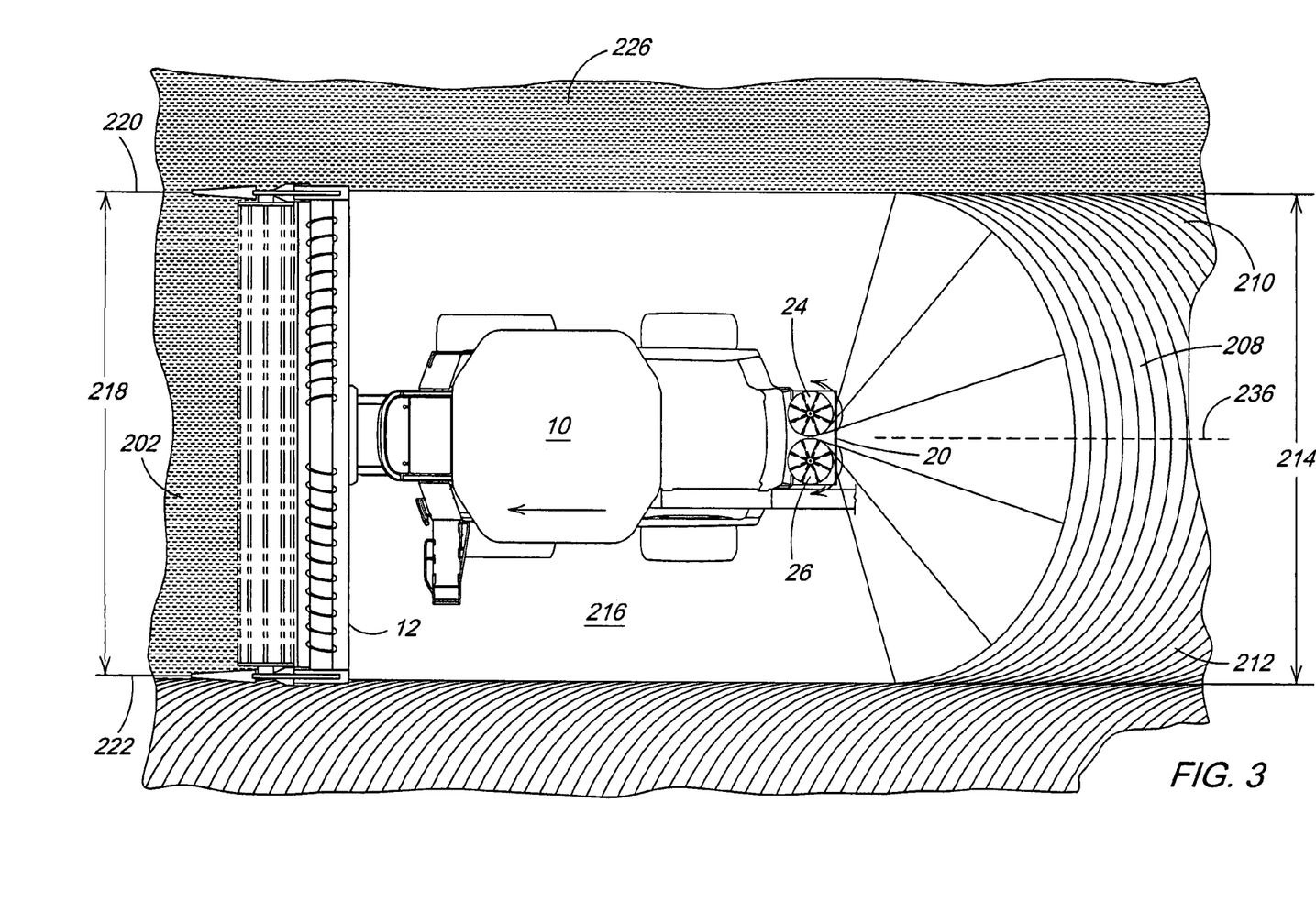
FIG. 3 is a top view of the combine shown with a spreader broadcast equal to a combine header cutting width, and extending between a right-edge and a left-edge of the combine header cutting width.

The spreader 20 is adapted to receive MOG 206 from the combine 10 and evenly broadcast it over a wide area of the field 200 behind the combine 10 as shown in FIG. 3. In operation, MOG 206 is expelled from the stalk chopper 30 toward the counter-rotating impellers 24 and 26. The impellers 24 and 26 receive the MOG 206 and broadcast it rearwardly and outwardly away from the combine 10 to achieve an even distribution 208 of MOG 206 over the field 200. Generally, MOG distribution width to the right-side of the combine 210 is attributed to the right-side impeller 24, and similarly, MOG distribution width to the left-side of the combine 212 is attributed to the left-side impeller 26. The total width 214 and location 236 of MOG distribution by the spreader 20 is largely dependent on the rotational speed of the impellers 24 and 26. The higher the rotational speed of the impellers 24 and 26, the wider the resulting broadcast width 214. The greater the differential in rotational speed between the impellers 22 and 24, the further the broadcast location 236 is directed away from being centered immediately behind the combine 10.

Figure 4:
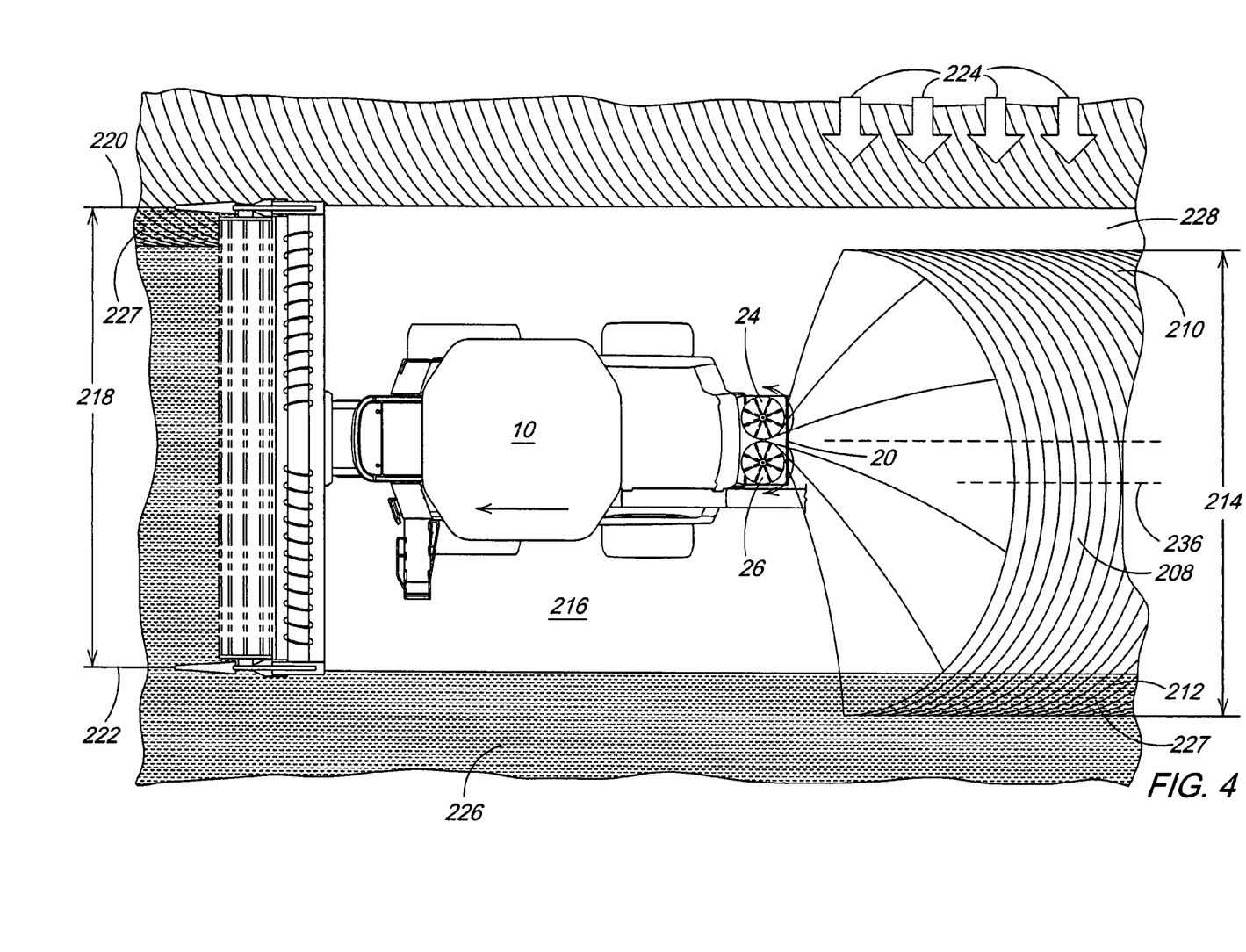
FIG. 4 is a top view of the combine having a spreader broadcast width equal to the combine header cutting width, shown subjected to a cross-wind from the right-side of the combine.
Figure 5:
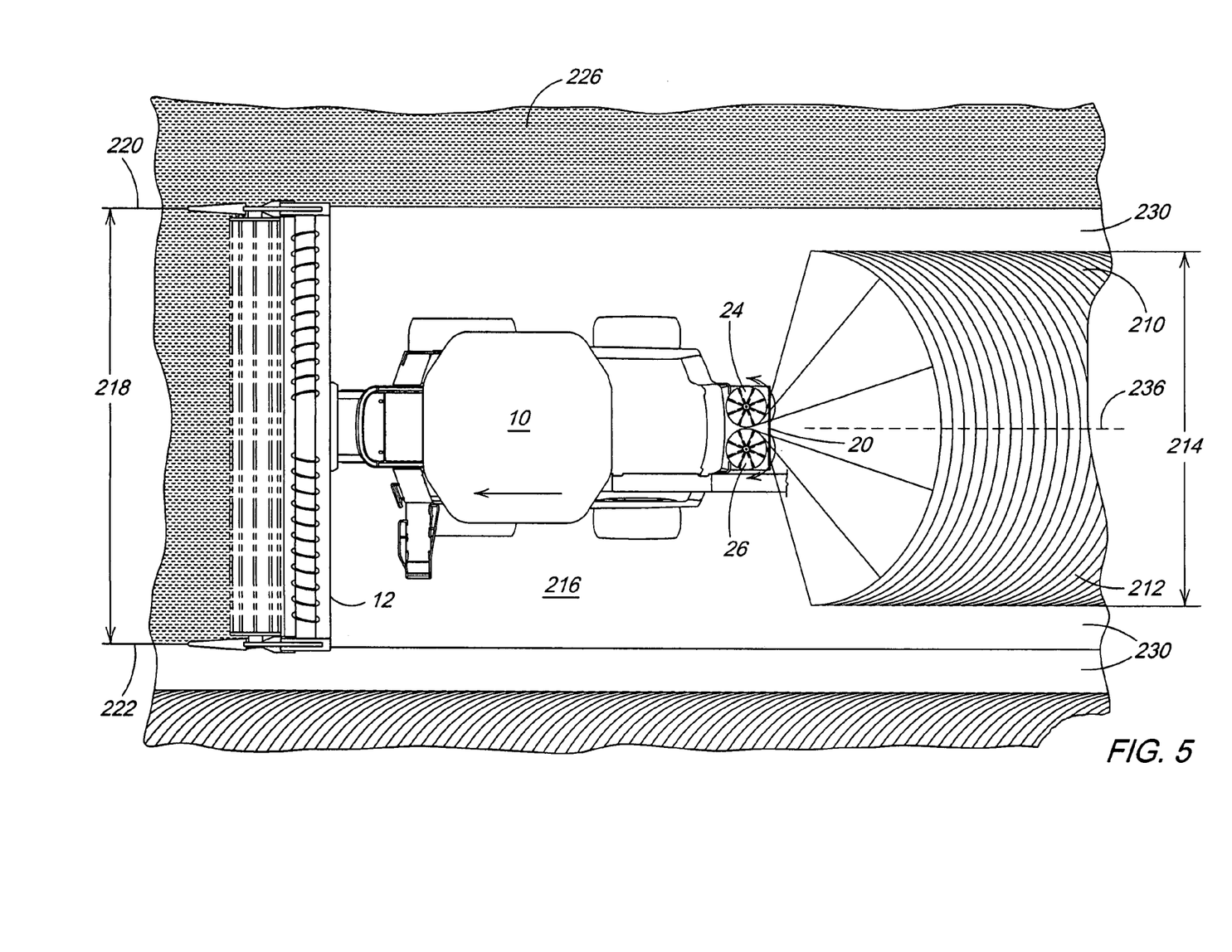
FIG. 5 is a top view of the combine having a spreader broadcast width narrower than combine header cutting width.
Figure 6:
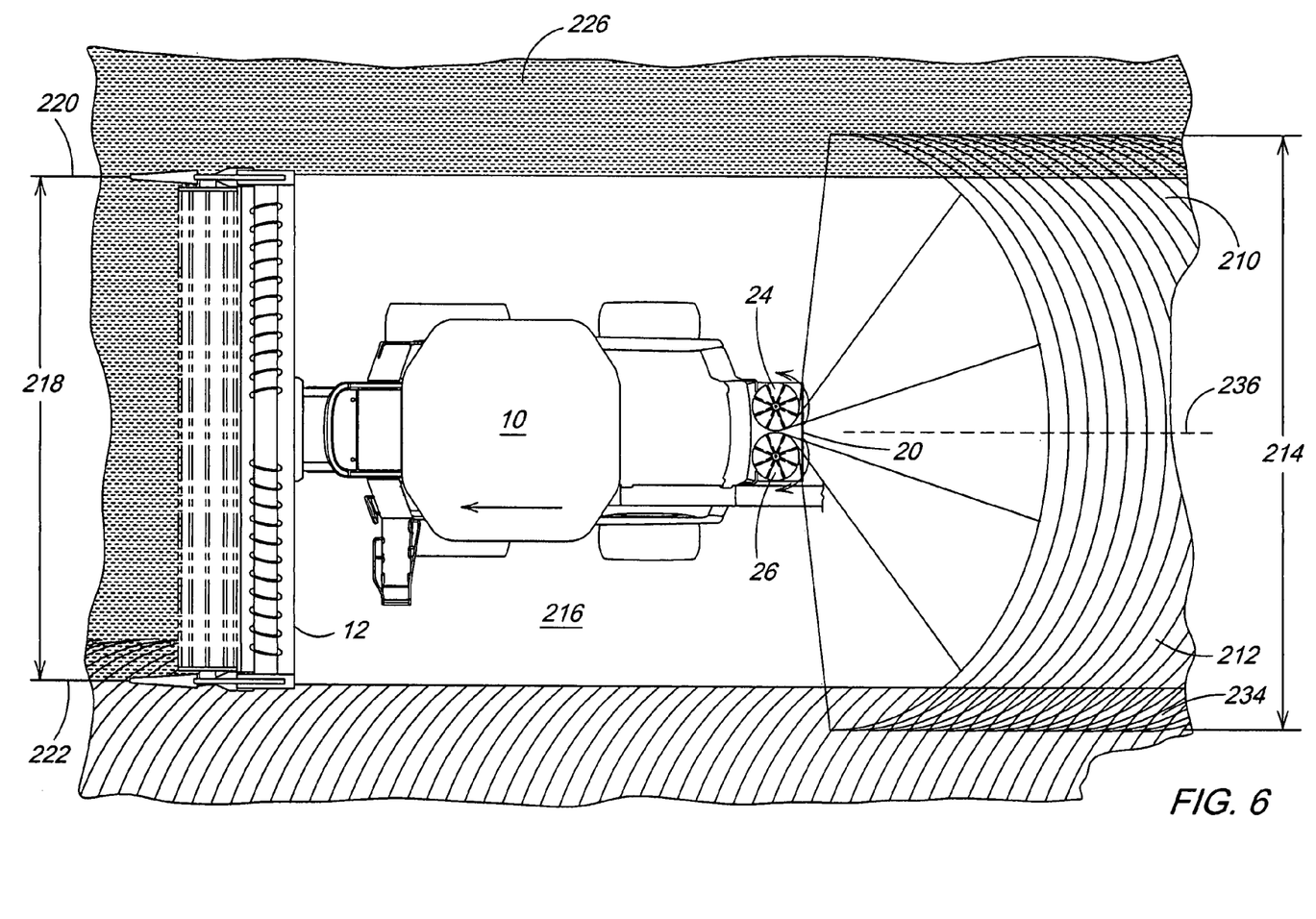
FIG. 6 is a top view of the combine having a spreader broadcast width wider than combine header cutting width.

When MOG 206 is broadcast by a spreader 20, it is desirable that the it cover only the region of the field that the combine 10 has just cut 216, with a width 214 and location 236 fully extending across a header cutting width 218 from a right-edge 220 to a left-edge 222, as illustrated in FIG. 3. External conditions, such as cross-winds 224 and side-slopes can affect broadcast location 236, causing MOG 206 to be spread onto un-cut regions 226, resulting in a over-coverage strip 227 illustrated in FIG. 4. When the combine 10 returns and cuts the crop 202 onto which MOG 206 has been spread, the MOG 206 in the over-coverage strip 227 is removed and reprocessed in the combine 10. When the MOG 206 is again broadcast subject to the above mentioned external conditions, a resulting strip of field is left uncovered 228 on the upwind or uphill side of the combine 10. In addition, crop conditions, such crop type and moisture content, can affect spreader broadcast width 214. If the crop 202 is heavier and wetter, the impellers 22 and 24 must turn faster to cover the entire cut region 216 behind the combine. If the broadcast width 214 is not maintained, strips of uncovered ground 230 may result, as shown in FIG. 5. Conversely, MOG 206 from lighter and dryer crop 202 may become spread well beyond the width of the cut portion 216 unless the impellers 22 and 24 turn slower, resulting in strips of thick coverage 232 and thin coverage 234, as shown in FIG. 6. Additionally, MOG 206 from lighter and dryer crop 202 may become entrained in the air, causing excessive airborne debris, and resulting in poor visibility and reduced life for air filters onboard the combine 10. Thus an effective means of maintaining a constant spreader broadcast width 214 and location 236, irregardless of external or crop conditions, is desired.

Figure 7:
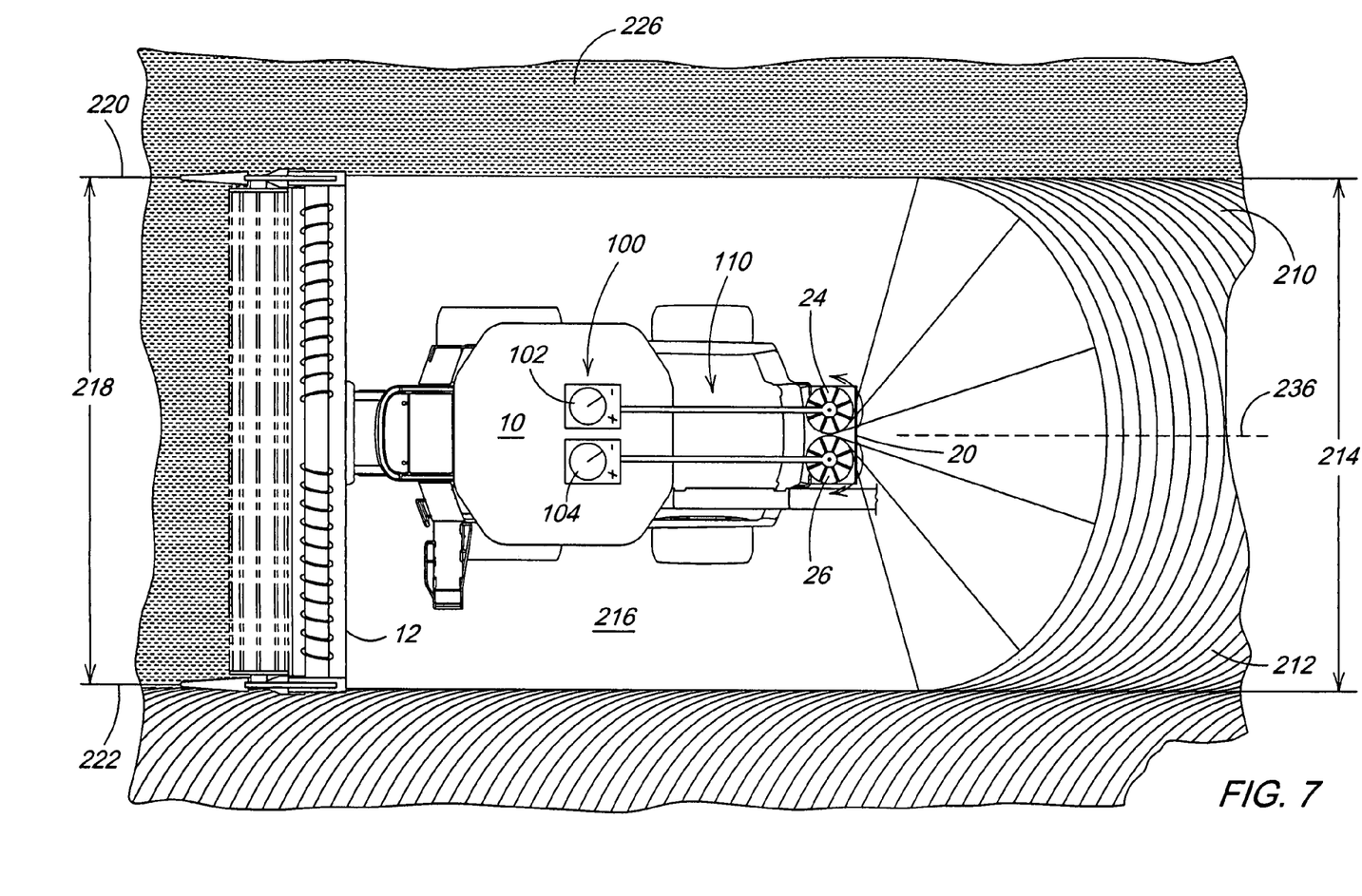
FIG. 7 is a schematic view of a first embodiment of the present invention, wherein individual impeller rotational speeds are varied manually by an operator.
Figure 8:
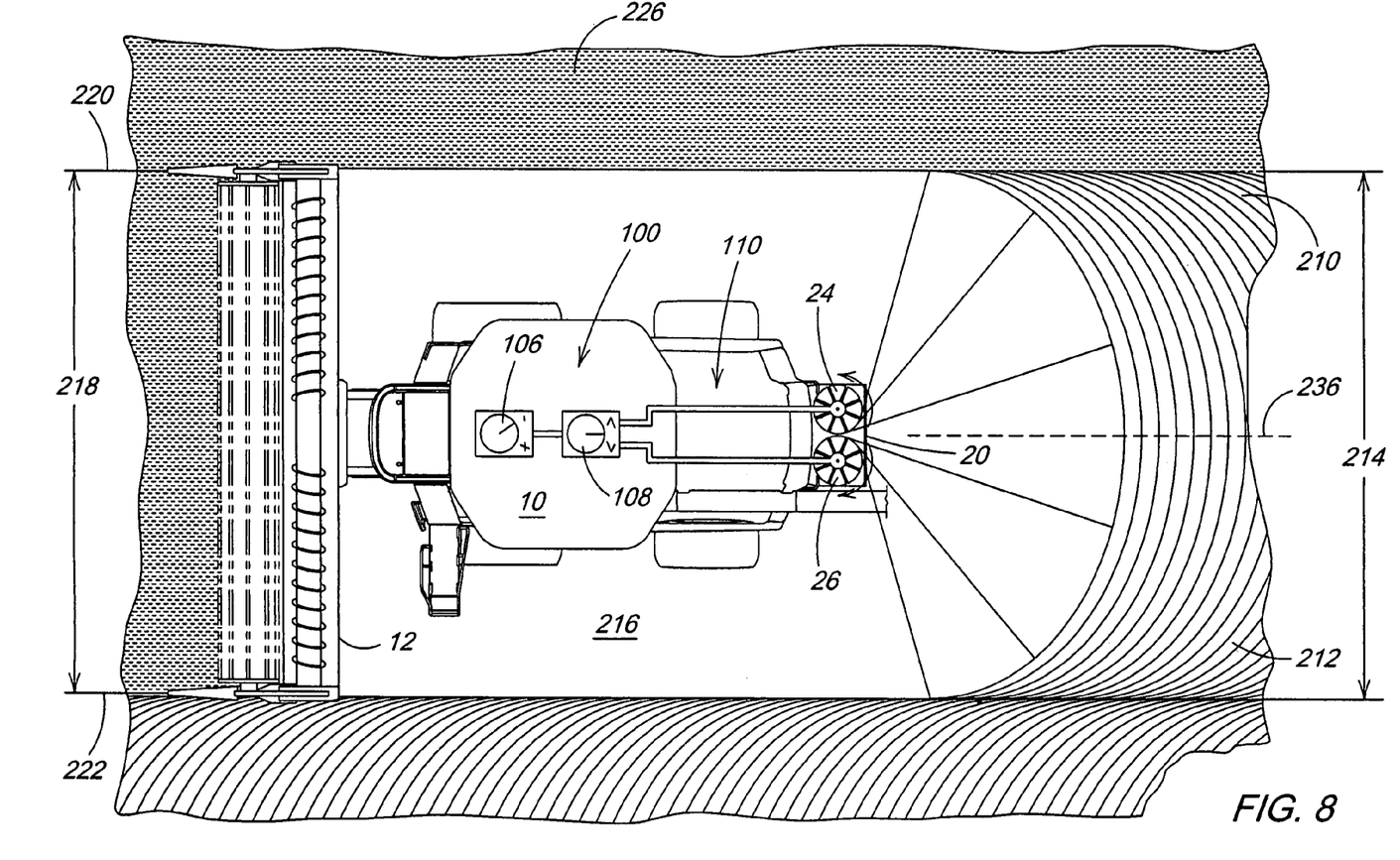
FIG. 8 is a schematic view of an alternate first embodiment of the present invention, wherein average and differential rotational speeds for the impellers are varied manually by an operator.

The present invention provides an effective means of maintaining a constant spreader broadcast width 214 and location 236 by controlling impeller 24 and 26 rotational speeds. In a first embodiment illustrated in FIGS. 7 and 8, the impeller 24 and 26 rotational speeds are varied manually by an operator to maintain a desired broadcast width 214 and location 236. The broadcast width 214 may be any width desired by the operator, or for example, may correspond to the header cutting width 218. This embodiment requires at least one command input device 100 to command impeller 24 and 26 speeds, and a circuit 110 to control impeller 24 and 26 speeds. The impeller 24 and 26 rotational speeds may be controlled either individually, or in an alternate embodiment, in tandem with an inverse speed differential between the impellers 24 and 26. The command input devices 100 could be mechanical valves, electrical dials or digital toggles. The input devices 100 could be used to directly command the circuit 110 controlling impeller 24 and 26 speed as shown in FIGS. 7 and 8, or could be adapted to signal a controller (not shown) adapted to command the circuit 110. The circuit 110 controlling impeller 24 and 26 speed could be hydraulic in the case of hydraulic motor driven impellers, electrical in the case of electric motor driven impellers, but would most likely be electro-hydraulic, as spreader impellers 24 and 26 are typically driven by hydraulic motors 38 and commanded by electrical control circuits.

In the case of individual impeller 24 and 26 control shown in FIG. 7, the operator visually monitors the broadcast width 214 and adjusts the rotational speed of the impeller 24 and 26 independently for each side of the combine 10. For example, if the operator determined that the broadcast width was not wide enough on the right-side 210, he could increase the rotational speed for the right-side impeller 24 via a right-side command input device 102 until a desired broadcast width was achieved for that side 210. Similarly, if the operator determined that the broadcast width was not wide enough on the left-side 212, he could increase the rotational speed for the left-side impeller 26 via a left-side command input device 104 until a desired broadcast width was achieved for that side 212.

In the alternate first embodiment of tandem impeller 24 and 26 speed control with an inverse speed differential between the impellers 24 and 26, as shown in FIG. 8, the operator visually monitors the overall broadcast width 214, and the drift in the broadcast location 236 from side to side. For example, if the operating conditions were with minimal wind and over a flat field 200, and the operator determined that the overall broadcast width 214 was too narrow, he could increase the rotational speed for both impellers 24 and 26 via a width command input device 106 until a desired overall broadcast width 214 was achieved. If a cross-wind 224 from the right-side were encountered, such that the broadcast location 236 tended to drift to the left-side, as illustrated in FIG. 4, the operator could compensate and bring the broadcast location 236 back to center by slowing the left-side impeller 26 rotational speed and increasing the right-side impeller 24 rotational speed inversely proportional to the left-side impeller 26 via a drift command input device 108.

Figure 9:
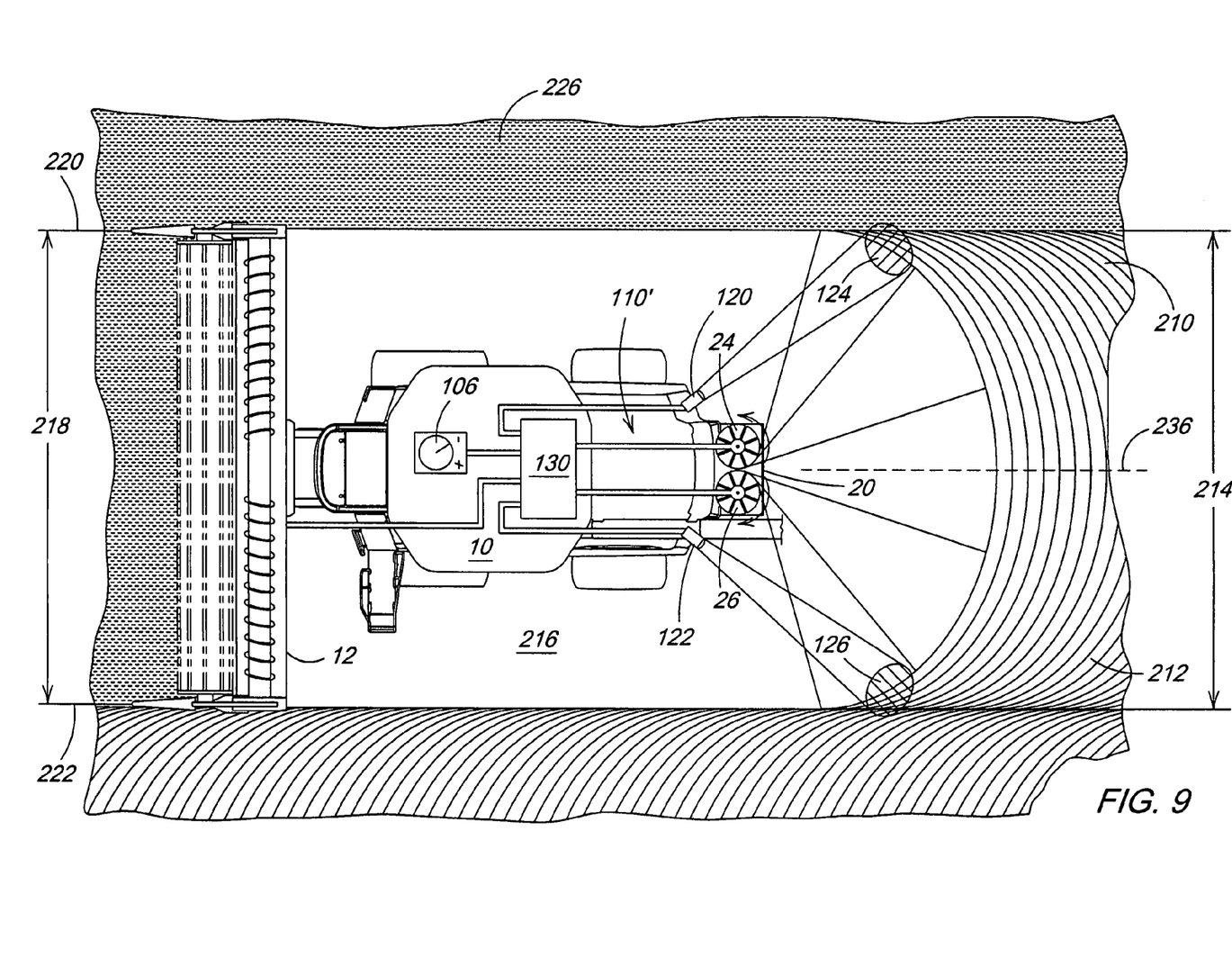
FIG. 9 is a schematic view of a second embodiment of the present invention, wherein impeller rotational speeds are varied automatically by a control system that directly monitors broadcast width.

FIG. 9 illustrates a second embodiment of the present invention, wherein the impeller 24 and 26 rotational speeds are varied automatically to maintain a desired broadcast width 214 and location 236 by a control system that directly monitors broadcast MOG 206. This embodiment requires one or more sensor input devices 120 and 122 to sense broadcast width 214, a controller 130 to command impeller 24 and 26 speed based on sensor information, and a circuit 110' like those described above to control impeller 24 and 26 speed. The sensors 120 and 122 in this embodiment may be electromagnetic (laser) or acoustical (sonar) sensors. The circuit 110 controlling impeller 24 and 26 speed would most likely be electro-hydraulic for hydraulic driven impellers 24 and 26, but could also be electrical in the case of electric motor driven impellers. This embodiment is a relatively simple system, since it involves a closed-loop sensor feedback that does not require computational adjustments from the controller 130.

In operation, the sensors 120 and 122 monitor a targeted zone 124 and 126 on each side of the combine 10, corresponding to the limits of the desired broadcast width 214, for the presence of broadcasted MOG 206. The controller 130 adjusts the rotational speeds of the impellers 24 and 26 based on the information provided by the sensors 120 and 122. For example, if a right-side sensors 120 sensed minimal MOG 206 levels in its targeted zone 124, indicating that the broadcast width is not wide enough on the right-side 210, the controller 130 would increase the rotational speed for the right-side impeller 24 until the right-side sensor 120 sensed nominal MOG 206 levels, indicating that a desired broadcast width was achieved for that side 210. Similarly, if a left-side 122 sensors sensed excessive MOG 206 levels in its targeted zone 126, indicating that the broadcast width is too wide on the left-side 212, the controller 130 would decrease the rotational speed for the left-side impeller 26 until the left-side sensor 122 sensed nominal MOG 206 levels, indicating that a desired broadcast width was achieved for that side 212.

It should be noted that the targeting of the sensors 120 and 122 in this embodiment would need to be initialized or adjusted for the desired broadcast width on both sides of the combine 210 and 212. This initial targeting could be done manually by the operator by physically targeting the sensors 120 and 122 while the system is operating until the desired broadcast width 214 is achieved. Alternatively, an automatic adjustment means could be employed for sensor 120 and 122 targeting, wherein a sensor 120 or 122 is moved by a controllable adjustment means to achieve a desired broadcast width 214. An example of an automatic targeting means might include the width command input device 106 like that described in the first embodiment, whereby the operator would select a desired broadcast width 214 via the command input device 106, but instead of directly controlling the impeller 24 and 26 speeds with the command input device 106, the controller 130 would move the sensors 120 and 122 for proper targeting based on the operator selection. Another example of an automatic targeting means might include additional sensors (not shown) to determine the header cutting width 218, with the controller 130 moving the sensors 120 and 122 for proper targeting so that the broadcast width 214 is matched to the cutting width 218. Determination of header cutting width 218 might be made by communication between the header 12 and the controller 130, or by additional sensors (not shown) adapted compare cut and un-cut crop regions 216 and 226 to determine the location of the right-edge 220 and left-edge 222 of the header cutting width 218. The above described examples might be further combined such that the operator might select a broadcast width 214 deviating from the header cutting width 218 by a desired value.

Figure 10:
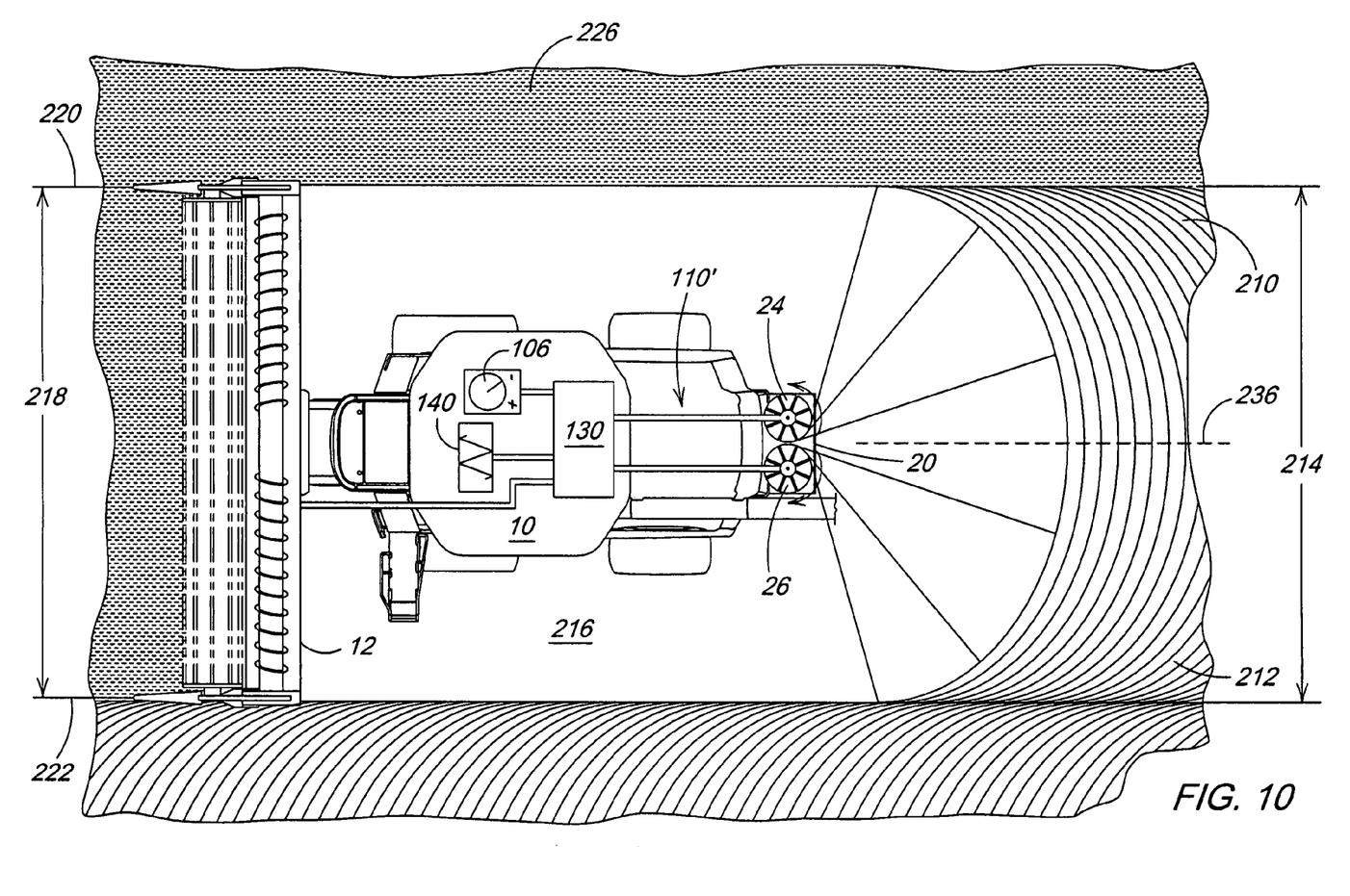
FIG. 10 is a schematic view of a third embodiment of the present invention, wherein impeller rotational speeds are varied automatically by a control system that monitors environmental conditions.

FIG. 10 illustrates a third embodiment of the present, wherein the impeller 24 and 26 rotational speeds are varied automatically to maintain a desired broadcast location 236 by a control system that monitors environmental conditions. This embodiment requires one or more sensors input devices 140 to sense environmental conditions, a controller 130 to command impeller 24 and 26 speed based on sensor 140 information and stored data, and a circuit 110' like those described above to control impeller 24 and 26 speed. In this method, the sensors 140 may include cross-wind speed (anemometer) sensors, or a vehicle side-slope (inclinometer) sensor. As in the second embodiments, the circuit 110' controlling impeller 24 and 26 speed would most likely be electro-hydraulic for hydraulic driven impellers, but could also be electrical in the case of electric motor driven impellers.

In operation, the sensors 140 would monitor side-to-side wind or slope conditions in which the combine 10 is operating. The controller 130 would then calculate a required compensation based on the sensed conditions, and adjust impeller 24 and 26 speeds to maintain a broadcast location 236 centered behind the combine 10. For example, if an anemometer sensed a cross-wind 224 from the right-side, indicating that the broadcast location 236 is drifting to the left-side as shown on FIG. 4, the controller 130 would calculate the appropriate speed for the impellers 24 and 26 to bring the broadcast location 236 back to center by increasing the rotational speed of the right-side impeller 24 and decreasing the rotational speed for the left-side 26 impeller. Similarly, if an inclinometer (not shown) sensed a side-slope up towards the right-side, indicating that the broadcast location 236 is drifting to the left-side, the controller 130 would calculate the appropriate speed for the impellers 24 and 26 to bring the broadcast location 236 back to center by increasing the rotational speed of the right-side impeller 24 and decreasing the rotational speed for the left-side impeller 26.

It should be noted that the third embodiment is an open-loop system that does not directly sense the MOG broadcast location 236, and requires the use of computational formulas and/or tables by the controller 130 to calculate appropriate impeller 14 and 26 speeds. Furthermore, this embodiment requires an additional method of establishing overall broadcast width 214, which could be done manually by the operator as described in the first embodiment, or automatically with the controller 130 calculating and controlling overall impeller 24 and 26 speeds based on header cutter width 218 and crop type. Determination of header cutting width 218 and crop type might be made by communication between the header 12 and the controller 130.

Finally, it is important to note that the elements of the first, second, and third embodiments might be further combined or utilized in numerous ways beyond those touched upon in the discussion above. For example, the inclinometer of the third embodiment could be used to provide information to the controller 130, such that the controller 130 could move the broadcast width sensors 120 and 122 of the second embodiment up or down for optimal ground targeting. As another example, broadcast width sensors 120 and 122 of the second embodiment might also be utilized as the sensors adapted to compare cut and un-cut crop regions 216 and 226 to determine the location of the right-edge 220 and left-edge 222 of the header cutting width 218 for the same embodiment. As described, the broadcast width sensors 120 and 122 in the second embodiment would provide input to the controller 130 for their own targeting.

Having described the illustrated embodiments, it will become apparent that various modifications can be made without departing from the scope of the invention as defined in the accompanying claims.

The invention claimed is:

1. A work vehicle having a fluent material spreader comprising:
    a variable speed right-side impeller rotationally attached to the work vehicle, the right-side impeller adapted to receive and broadcast fluent material out to a right-side material broadcast width as a function of rotational speed;

a variable speed left-side impeller rotationally attached to the work vehicle, the left-side impeller counter-rotating to the right-side impeller, the left-side impeller adapted to receive and broadcast fluent material out to a left-side material broadcast width as a function of rotational speed;

a right-side command input device adapted to command a desired rotational speed of the right-side impeller, wherein the desired rotational speed of the right-side impeller corresponds to a desired right-side material broadcast width; and a left-side command input device adapted to command a desired rotational speed of the left-side impeller, wherein the desired rotational speed of the left-side impeller corresponds to a desired left-side material broadcast width.

2. The work vehicle described in claim 1 wherein the work vehicle is a combine having a header for cutting crop, and the fluent material is crop material other than grain expelled from the combine.

3. The work vehicle described in claim 2 wherein the header has a cutting width having a right-edge and a left-edge, and wherein the desired right-side material broadcast width extends to the right-edge of the cutting width, and the desired left-side material broadcast width extends to the left-edge of the cutting width.

4. A work vehicle having a fluent material spreader comprising:

a variable speed right-side impeller rotationally attached to the work vehicle, the right-side impeller adapted to receive and broadcast fluent material out to a right-side material broadcast width as a function of rotational speed;

a variable speed left-side impeller rotationally attached to the work vehicle, the left-side impeller counter-rotating to the right-side impeller, the left-side adapted to receive and broadcast fluent material out to a left-side material broadcast width as a function of rotational speed;

a right-side sensor attached to the work vehicle, the right-side sensor adapted to sense a magnitude of fluent material within a right-side target zone;

a left-side sensor attached to the work vehicle, the left-side sensor adapted to sense a magnitude of fluent material within a left-side target zone; and a controller in communication with the right-side impeller, the left-side impeller, the right-side sensor, and the left-side sensor, the controller being adapted to increase rotational speed of the right-side impeller when the magnitude of fluent material sensed by the right-side sensor is below a nominal value, and to decrease rotational speed of the right-side impeller when the magnitude of fluent material sensed by the right-side sensor is below a nominal value, the right-side target zone being established such that a desired right-side broadcast width is realized when the magnitude of fluent material sensed by the right-side sensor is at a nominal value, the controller being further adapted to increase rotational speed of the left-side impeller when the magnitude of fluent material sensed by the left-side sensor is below a nominal value, and to decrease rotational speed of the left-side impeller when the magnitude of fluent material sensed by the left-side sensor is below a nominal value, the left-side target zone being established such that a desired left-side broadcast width is realized when the magnitude of fluent material sensed by the left-side sensor is at a nominal value.

5. The work vehicle described in claim 4 wherein the both the right-side sensor and the left-side sensor are acoustical sensors.

6. The work vehicle described in claim 5 wherein the work vehicle is a combine having a header for cutting crop, and the fluent material is crop material other than grain expelled from the combine.

7. The work vehicle described in claim 6 wherein the header has a cutting width having a right-edge and a left-edge, and wherein the desired right-side material broadcast width extends to the right-edge of the cutting width, and the desired left-side material broadcast width extends to the left-edge of the cutting width.

8. The work vehicle described in claim 7 wherein the right-size target zone and the left-side target zone are determined automatically.

9. The work vehicle described in claim 4 wherein the both the right-side sensor and the left-side sensor are electromagnetic sensors.

10. The work vehicle described in claim 9 wherein the work vehicle is a combine, and the fluent material is material other than grain expelled from the combine.

11. The work vehicle described in claim 10 wherein the header has a cutting width having a right-edge and a left-edge, and wherein the desired right-side material broadcast width extends to the right-edge of the cutting width, and the desired left-side material broadcast width extends to the left-edge of the cutting width.

12. The work vehicle described in claim 11 wherein the right-size target zone and the left-side target zone are determined automatically.

* * * * *